United States Patent [19]

Jezo

[11] 4,032,756

[45] June 28, 1977

[54] TACAN-DME IDENTITY DETECTOR

[75] Inventor: Maurice Leon Jean Jezo, Cedar Grove, N.J.

[73] Assignee: International Telephone and Telegraph Corporation, Nutley, N.J.

[22] Filed: Aug. 14, 1975

[21] Appl. No.: 604,759

[52] U.S. Cl. .................... 235/92 PB; 235/92 MS; 235/92 PE; 235/92 R; 343/106 R
[51] Int. Cl.² ..................... G01S 1/44; H03K 21/36
[58] Field of Search ................. 235/150.24, 150.26, 235/150.27, 92 PE, 92 CA, 92 CC, 92 CT, 92 LG, 92 PB, 92 MS, 92 B, 92 R; 343/7 A, 7 ED, 11 R, 101, 102, 112 C, 112 D, 113 R, 106 R

[56] References Cited

UNITED STATES PATENTS

| | | | |
|---|---|---|---|
| 3,272,970 | 9/1966 | Laycak et al. | 235/92 PE |
| 3,332,080 | 7/1967 | Verwey | 235/150.26 |
| 3,473,130 | 10/1969 | Briggs | 328/109 |
| 3,824,378 | 7/1974 | Johnson et al. | 235/92 PE |

Primary Examiner—Joseph M. Thesz

Attorney, Agent, or Firm—John T. O'Halloran; Vincent B. Ingrassia

[57] ABSTRACT

This relates to a method and apparatus for extracting identity information from a Tacan signal which occurs during a 5 second interval every 37.5 seconds. The identity information consists of marks and spaces wherein a mark comprises a predetermined number of adjacent group reference signals, each having therebetween a plurality of regularly spaced Tacan pulse pairs. The Tacan signal is sampled at regular intervals following each group reference signals by means of a gating arrangement. A first counter counts the number of coincidences between pulse pairs and gates generated by the gating arrangement. A second counter counts the total number of gates generated and when the ratio of the number of coincidences to the total number of gates reaches a preset threshold, a mark counter is incremented. When the ratio of the contents of the mark counter to the total number of group reference signals reaches a preset value, a mark is declared. If a preset number of intervals between group reference signals occur which do not meet the requirements of a mark, a space is declared.

11 Claims, 7 Drawing Figures

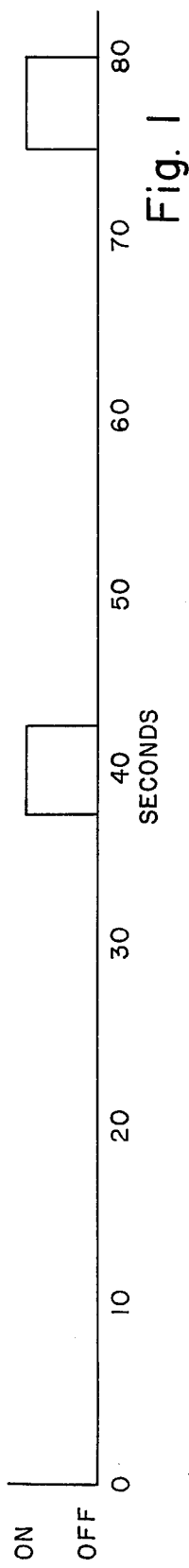
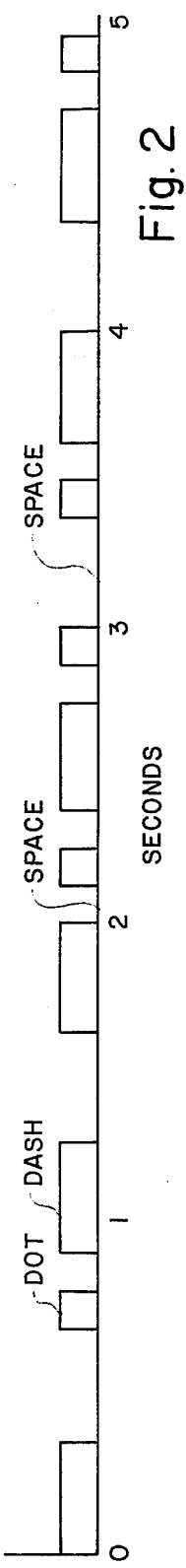
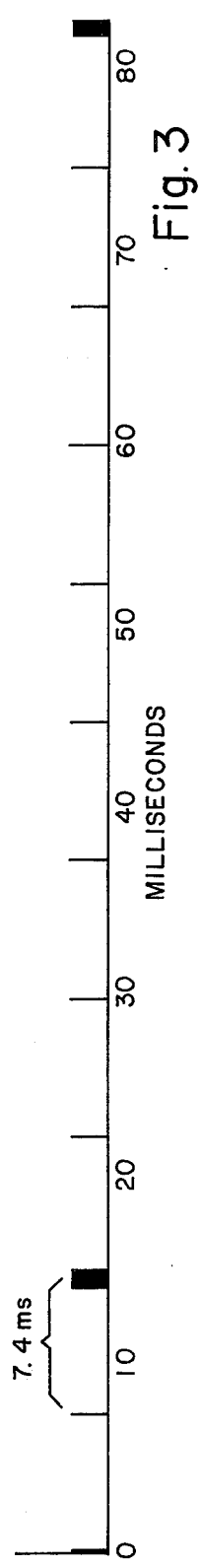
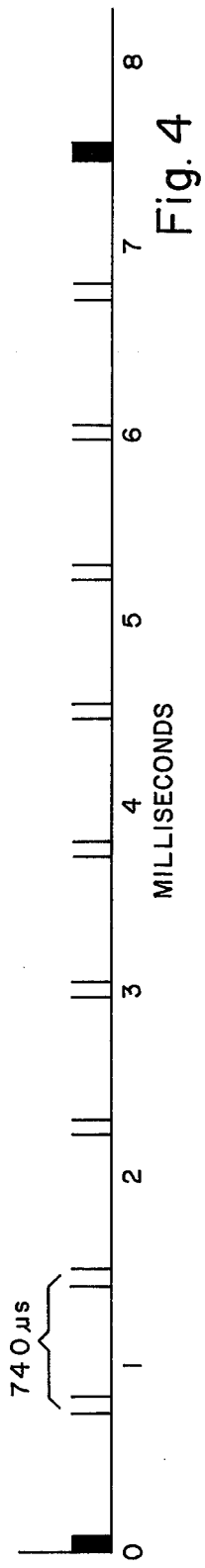
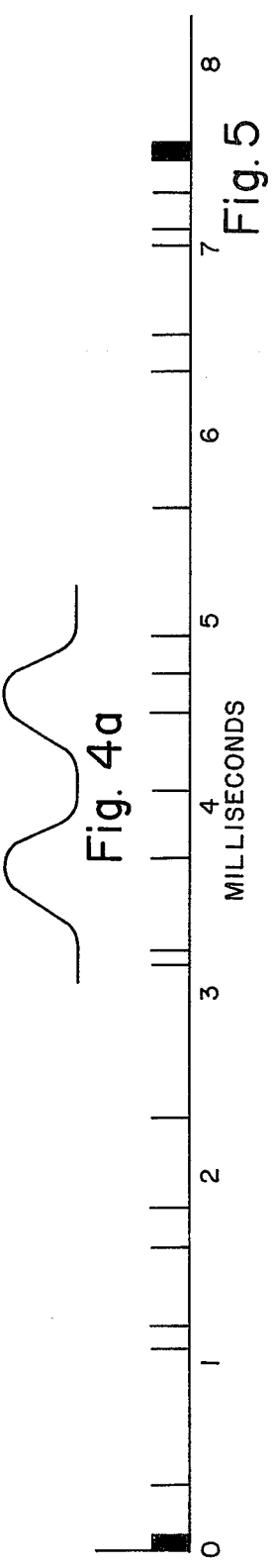

TACAN-DME IDENTITY DETECTOR

BACKGROUND OF THE INVENTION

This relates to a method and apparatus for extracting information from a signal and, more particularly, to a method and apparatus for extracting identity information from the conventional Tacan signal while using a minimum amount of receiver duty cycle.

There currently exists methods of extracting navigation information (distance and bearing) from standard Tacan/DME signals while utilizing only a small percentage of the airborne receiver duty cycle, i.e., less than 1%. This has made practical the time-sharing of an airborne receiver in order that a plurality of airborne functions may be performed, e.g., IFF and Joint Tactical Information Distribution Systems (JTIDS-I and JTIDS-II). However, the current techniques of detecting the identity signal, employed in all existing military Tacan and civilian distance measuring equipment (DME) sets still requires 100% receiver duty cycle during detection of the identity signal which may last for up to 5 seconds during every 37.5 second interval. As a consequence, time-sharing is impractical using standard techniques of identity signal detection.

SUMMARY OF THE INVENTION

It is an object of the present invention to provide a method and apparatus for extracting the Tacan identity signal while at the same time utilizing a substantially reduced amount of receiver duty cycle.

According to a broad aspect of the invention, there is provided an apparatus for extracting identity information from a Tacan signal wherein said identity information consists of marks and spaces and wherein said Tacan signal includes group reference signals, said marks comprising a predetermined number of adjacent group reference signals having therebetween a plurality of regularly spaced Tacan pulse pairs comprising: means for sampling said Tacan signal at predetermined sample intervals after each group of said group reference signals; means for indicating a hit when one of said regularly spaced pulse pairs is present during said sample interval; a mark counter; means for incrementing said mark counter when the ratio of hits to sample intervals between adjacent group reference signals equals a preselected value; and means for declaring a mark when the ratio of the contents of said mark counter to the total number of group reference signals equals a preselected value and for declaring a space when the ratio of the contents of said mark counter to the total number of group reference signals is less than said preselected value.

According to a further aspect of the invention, there is provided a method for extracting identity information from a Tacan signal including group reference signals wherein said identity information consists of marks and spaces and wherein a mark comprises a predetermined number of adjacent group reference signals each having therebetween a plurality of regularly spaced Tacan pulse pairs comprising: sampling said Tacan signal at predetermined sample intervals following each of said group reference signals; incrementing a first counter when one of said regularly spaced pulse pairs is present during said sample interval; incrementing a second counter when the ratio of the contents of said first counter to the total number of sample intervals between adjacent group reference signals exceed a predetermined value; generating a mark when the ratio of the contents of said second counter to the total number of group reference signals is below a predetermined value.

The above and other objects of the present invention will be more clearly understood from the following detailed description taken in conjunction with the accompanying drawings in which:

BRIEF DESCRIPTION OF THE DRAWINGS

FIG. 1 shows the identity signal duty cycle corresponding to 5 seconds out of every 37.5 second interval.

FIG. 2 illustrates a typical identity signal consisting of dots, dashes and spaces in accordance with the well-known Morse Code.

FIG. 3 illustrates the standard Tacan group signals occurring every 7.4 milliseconds.

FIG. 4 shows the pulse pairs which occur between adjacent group signals at a time when the identity signal is high, i.e., during a mark.

FIG. 4a illustrates a typical Tacan pulse pair signal in accordance with MIL-STD 291B.

FIG. 5 illustrates a typical signal environment between adjacent group signals during spaces within the identity signal and during the time between adjacent identity signals.

DESCRIPTION OF THE PREFERRED EMBODIMENT

Figure 6:
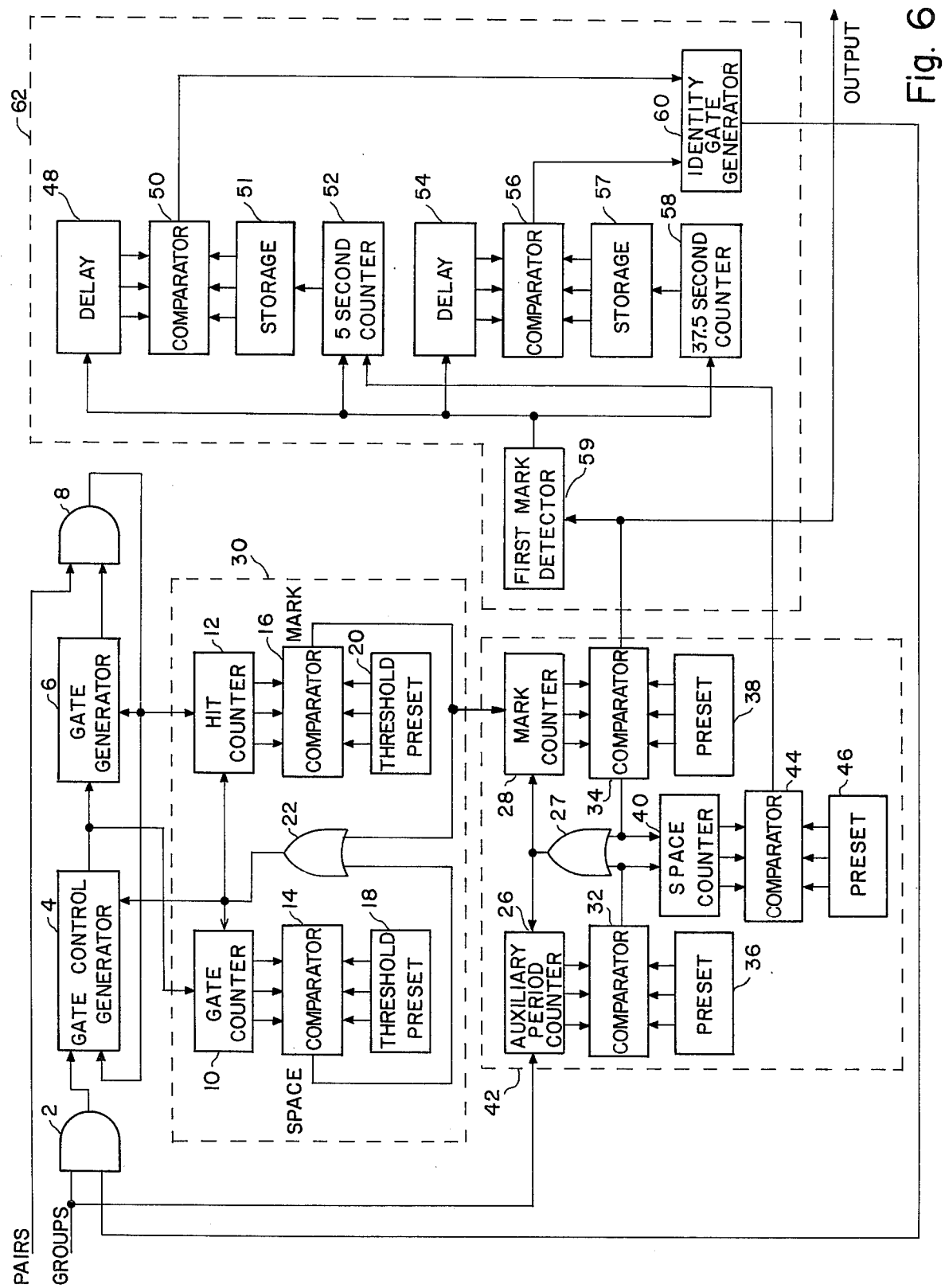
FIG. 6 is a block diagram of an arrangement for extracting the identity signal in accordance with the present invention.

The invention is based on the use of a priori information about the identity signl to track, in time, a fraction of the total number of pulse pairs available during the standard identity signal. The track mode is preceded by an acquisition phase.

FIG. 1 illustrates the total identity signal duty cycle which corresponds to 5 seconds occurring every 37.5 seconds, and FIG. 2 illustrates a typical identity signal comprising dots, dashes and spaces. In FIG. 2, the identity signal is shown to require the entire 5 second duration. It should be understood, however, that the identity signal may be substantially shorter. It is only necessary that the identity signal occur within the 5 second interval allocated for identity purposes.

As shown in FIG. 3, time is divided into elemental intervals called auxiliary periods which are 7.4 milliseconds long and are bracketed by the standard Tacan group signals. Depending on the result of sampling the identity signal at a time when identity pairs are expected, the auxiliary periods will be classified either a mark (dot or dash) or a space as will be more fully described below. It will also be seen that it is necessary to distinguish between dots, dashes and spaces. A typical dot has a duration of approximately 17 auxiliary periods, as does a typical space. A typical dash has a duration of approximately 51 auxiliary spaces.

For a clear understanding of the inventive method and apparatus, FIG. 4 illustrates the pairs of pulse pairs which occur between adjacent group signals during a mark. FIG. 4a illustrates a typical Tacan pulse pair in accordance with MIL-STD 291B. FIG. 5 illustrates a signal environment between adjacent group signals during a space. The space may be between adjacent marks in the identity signal or between adjacent identity signals at a time not allocated for identification purposes.

Referring to FIG. 6, there is shown a block diagram of an apparatus for carrying out identity signal extraction at a reduced receiver duty cycle. The apparatus is divided into three main sections: a mark/space decoder 30, a character decoder 42 and a timing control unit 62.

The device receives two input signals; the group signals, which are derived from the conventional group detector of a Tacan set and pair signals derived from the conventional Tacan pair detector. The output of the device may consist of the actual identity signal in the form of a level which is high during a mark and low during a space.

An AND-gate 2 has two inputs, the first of which receives the Tacan group signals as shown in FIG. 3. To facilitate an explanation of the arrangement, it will be assumed for the time being that the second input to AND-gate 2 is in a state which allows gate 2 to pass the group signals. The group signals which pass through AND-gate 2 trigger a gate control generator 4 which, after a delay of 740 microseconds, triggers a gate generator 6. Gate generator 6 immediately generates a gate 70 microseconds wide. The output of gate generator 6 enables AND-gate 8 and allows the Tacan pairs to pass through gate 8.

Each pair which passes through the gate increments a hit counter 12, terminates the gate generated by gate generator 6 and triggers gate control generator 4. Gate control generator 4 and gate generator 6 are designed such that when triggered by a pulse pair, the gate control generator triggers the gate generator at spacings of 740 and 100 microseconds alternatively whether or not a pulse pair is subsequently received. It should be clear that the spacing between pairs within a mark is alternatively 740 microseconds seconds while the pulse spacing within a pair is either 12 or 36 microseconds depending upon the channel of operation (X or Y mode).

The triggers of gate control generator 4 also increment a gate counter 10. As explained above, this will occur even in the absence of a hit. A miss occurs when no pulse occurs during the gate produced by gate generator 6. This results in the incrementing of gate counter 10 only. A decision level for both the gate counter 10 and hit counter 12 may be preset via threshold presets 18 and 20. When either the gate counter or hit counter reach the count set in presets 18 and 20, an affirmative comparison will be made in either comparator 14 or 16. In short, every output of the gate control generator 4 will increment gate counter 10, whereas only the coincidence of a pulse pair and the output of gate generator 6 will cause the hit counter to be incremented.

If, for example, three hits occur out of eight gates, a mark will be declared. If eight gates are generated prior to three hits, a space will be declared. In either event, the outputs of comparators 14 and 16 are applied to OR-gate 22, whose output in turn resets gate counter 10, hit counter 12 and gate control generator 4. In this manner, each auxiliary period will be labeled either a mark or a space.

It is next necessary to determine, in character decoder 42, whether the mark is a dot or dash or whether a sufficient number of empty auxiliary periods have occurred in order that a space may be declared.

As in the mark/space decoder, two counters are employed in the character decoder, i.e., auxiliary period counter 26 and mark counter 28. Each time an auxiliary period has been declared a mark, mark counter 28 is incremented. Auxiliary period counter 26 is incremented by the Tacan group signals. Threshold levels may again be set into presets 36 and 38. If counter 26 reaches its preset state prior to mark counter 28 as determined by comparator 32, a space will be declared and space counter 40 incremented. If, however, mark counter 28 reaches its preset state first, comparator 34 will generate an affirmative output. In either event, both the auxiliary period counter 26 and the mark counter 28 will be reset. Comparator 34 may be designed to output the mark itself. This is further simplified by the fact that a dash is merely three adjacent dots.

Finally, it is necessary to determine when the identity signal has ended. For this purpose, a preset number of spaces may be indicative of the end of the identity signal. Therefore, each time an auxiliary period is declared a space via counter 26, comparator 32 and preset 36, space counter 40 is incremented. Each time a mark is declared, the space counter 40 is reset. If the space counter should reach a state equivalent to that which is set into preset 46, comparator 44 will generate an affirmative signal indicating the end of the identity signal, which identity signal is applied to timing control unit 62.

It should be noted that thus far, all of the devices discussed are either standard or such that they may be easily designed by the skilled logic designer. For example, the counters may all be digital counters, the comparators — a series of coincidence gates, and the presets — a series of flip-flops.

The first affirmative signal generated by comparator 34 is detected in detector 59, whose output is delayed for approximately 5 seconds in delay 48 and for approximately 37.5 seconds in delay 54. The output of delay 54 causes identity gate generator 60 to open a gate which enables AND-gate 2. Approximately 5 seconds later, the output of delay 48 causes this gate to be closed. Identity code extraction occurs only when AND-gate 2 is enabled.

Since the identity signal may be less than 5 seconds, the first affirmative signal generated by comparator 34 causes counters 52 and 58 to begin counting. Counter 52 will count until disabled by the detection of the last space by comparator 44. When this occurs, both delay 48 and counter 52 are disabled. The contents of counter 52 are then stored in storage 51 and the counter is reset and will begin counting only when the next first mark is detected by first mark detector 59. The output of detector 59 also causes the contents of counter 58 to be stored in storage 51 and counter 58 to be reset and again begin counting. In this manner, the delays induced in a subsequent cycle will correspond to intervals measured by counters 52 and 58 in a previous cycle. This is due to the fact that the identification signal may not occupy the entire 5 second interval allocated for identification purposes as explained earlier and that the identity repetition period may differ somewhat from 37.5 seconds. The actual delay is controlled by comparators 50 and 56. For example, delays 48 and 54 might include digital counters which count until coincidence with storage units 51 and 57 respectively is detected by comparators 50 and 56 respectively. However, it should be clear that any other tracking loop may be employed.

It can be seen that three major factors have resulted in a reduction in the amount of receiver duty cycle used. First, the tracking has occurred only during the actual identity signal. Second, sampling occurs only when the identity pairs are expected. Third, only a predetermined number of pair positions are sampled to reach reliable decisions. As can be seen from FIG. 5, an insufficient number of pairs will coincide with the gates generated by gate generator 6 during a space. Therefore, hit counter 12 will not reach its preset state and no marks will be declared.

While the principles of this invention have been described above in connection with specific apparatus, it is to be understood that this description is made only by way of example and not as a limitation on the scope of the invention as set forth in the objects and features thereof and in the accompanying claims.

What is claimed is:

1. An apparatus for extracting identity information from a Tacan signal wherein said identity information consists of marks and spaces and wherein said Tacan signal includes group reference signals, said marks comprising a predetermined number of adjacent group reference signals having therebetween a plurality of regularly spaced Tacan pulse pairs comprising:
    means for sampling said Tacan signal at predetermined sample intervals after each of said group reference signals, said means for sampling comprising:
        first means for receiving said group reference signals;
        second means for receiving said pulse pairs;
        trigger means coupled to said first and second receiving means for generating trigger signals in response to said group reference signals and pulse pairs; and
    means responsive to said trigger signals for generating a plurality of regularly spaced gating signals;
    means for indicating a hit when one of said regularly spaced pulse pairs is present during said sample interval;
    a mark counter;
    means for incrementing said mark counter when the ratio of hits to sample intervals between adjacent group reference signals equals a preselected value; and
    means for declaring a mark when the ratio of the contents of said mark counter to the total number of group reference signals equals a preselected value and for declaring a space when the ratio of the contents of said mark counter to the total number of group reference signals is less than said preselected value.

2. An apparatus according to claim 1 wherein said indicating means comprises means for generating a hit signal each time a pulse pair coincides with one of said gating signals.

3. An apparatus according to claim 2 wherein said incrementing means comprises:
    a first counter coupled to said indicating means, which first counter is incremented each time a hit is indicated;
    a second counter coupled to said trigger means, which second counter is incremented each time a trigger signal is generated;
    first means for comparing the contents of said first counter with a predetermined value and generating a first output signal when an affirmative comparison is made, said first output signal incrementing said mark counter;
    second means for comparing the contents of said second counter with a predetermined value and generating a second output when an affirmative comparison is made; and
    means responsive to the first of said first and second outputs for resetting said first and second counters.

4. An apparatus according to claim 3 wherein said declaring means comprises:
    a third counter for counting the total number of group reference signals;
    means for comparing the contents of said mark counter with a predetermined value and generating a third output indicating a mark when an affirmative comparison is made;
    means for comparing the contents of said third counter with a predetermined value and generating a fourth output indicating a space when an affirmative comparison is made; and
    means responsive to the first of said third and fourth outputs for resetting said mark counter and said third counter.

5. An apparatus according to claim 4 further including means for indicating the conclusion of said identity information.

6. An apparatus according to claim 5 wherein said means for indicating the conclusion of said identity information comprises:
    a fourth counter for counting successive spaces;
    means for comparing the contents of said fourth counter with a predetermined value and generating a fifth output when an affirmative comparison is made, said fourth counter being reset when a mark is declared.

7. An apparatus according to claim 6 wherein said identity information occurs at specified time intervals and further including means for enabling said sampling means during said specified intervals and inhibiting said sampling means at all other times.

8. An apparatus according to claim 1 wherein said declaring means comprises:
    a third counter for counting the total number of group reference signals;
    means for comparing the contents of said mark counter with a predetermined value and generating a third output indicating a mark when an affirmative comparison is made;
    means for comparing the contents of said third counter with a predetermined value and generating a fourth output indicating a space when an affirmative comparison is made; and
    means responsive to the first of said third and fourth outputs for resetting said mark counter and said third counter.

9. An apparatus according to claim 1 further including means for indicating the conclusion of said identity information.

10. An apparatus according to claim 9 wherein said means for indicating the conclusion of said identity information comprises:
    a fourth counter for counting successive spaces;
    means for comparing the contents of said fourth counter with a predetermined value and generating a fifth output when an affirmative comparison is made, said fourth counter being reset when a mark is declared.

11. An apparatus according to claim 1 wherein said identity information occurs at specified time intervals and further including means for enabling said sampling means during said specified intervals and inhibiting said sampling means at all other times.

* * * * *